March 13, 1951 P. LETELIER 2,545,408
INDEXING MECHANISM
Filed April 26, 1945 3 Sheets-Sheet 1

Inventor
PABLO LETELIER

By *Clarence A. O'Brien and Harvey B. Jacobson*
Attorneys

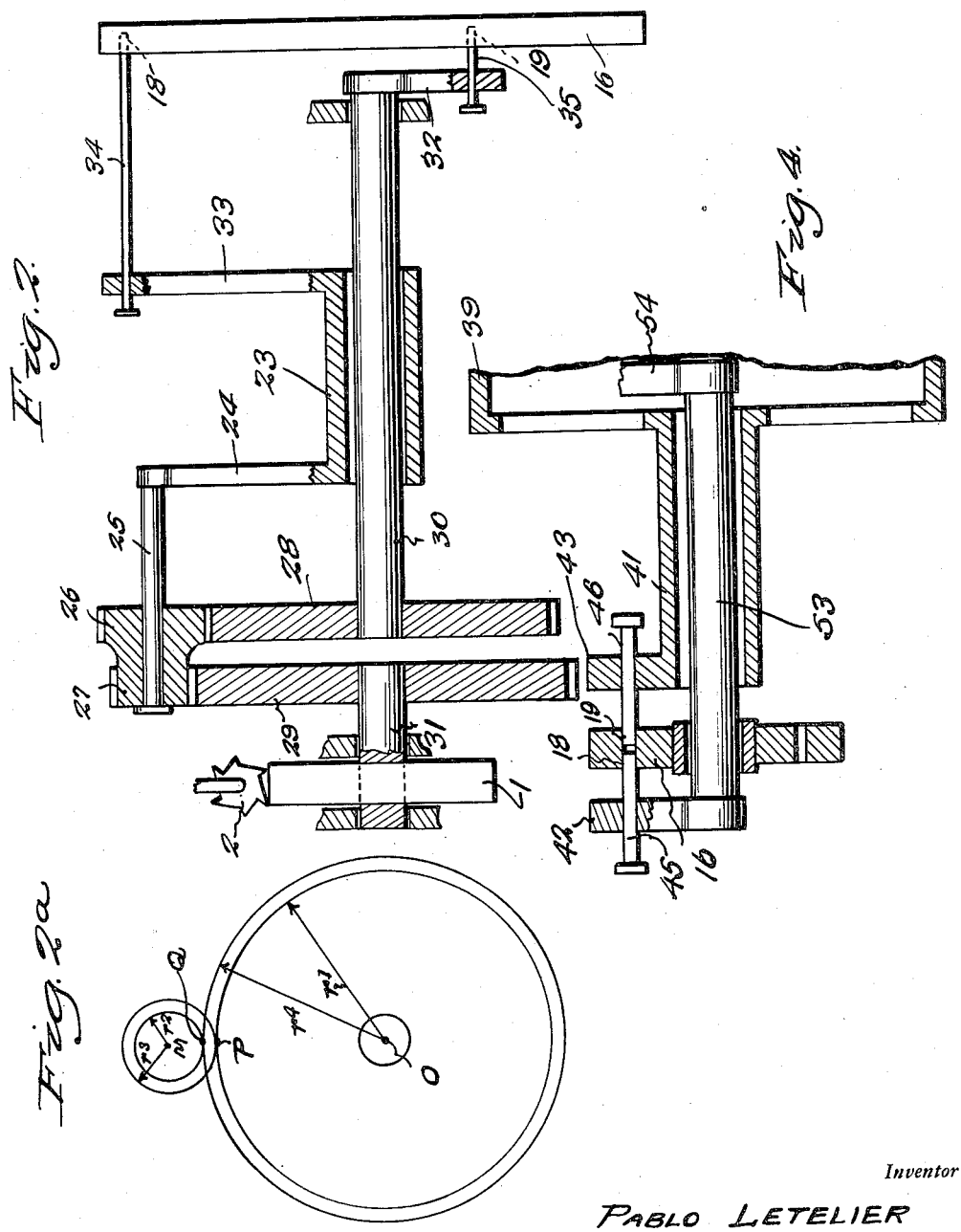

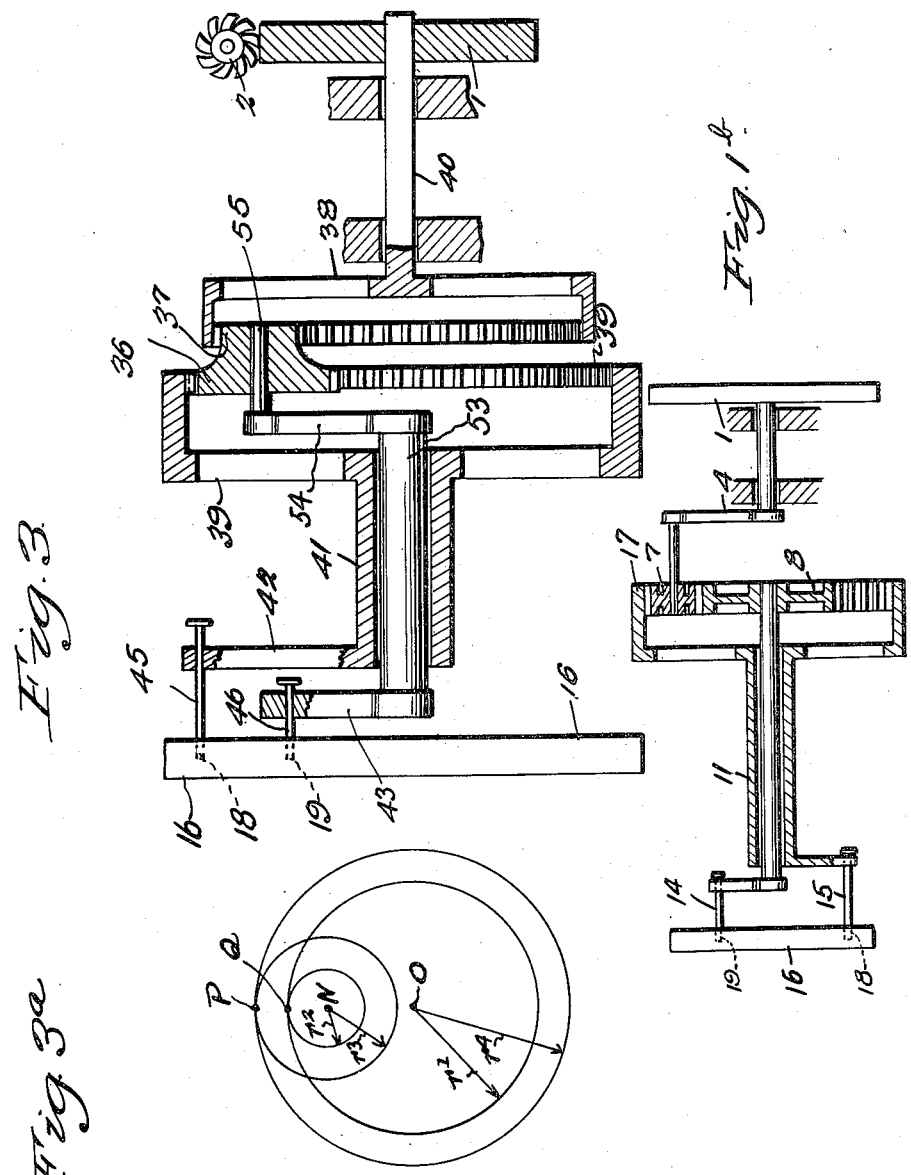

Patented Mar. 13, 1951

2,545,408

UNITED STATES PATENT OFFICE 2,545,408

INDEXING MECHANISM

Pablo Letelier, Santiago, Chile

Application April 26, 1945, Serial No. 590,333

2 Claims. (Cl. 90—57)

This invention relates to precision devices for dividing the circumference or for regulating the angular advance of work pieces to be machined with a very high degree of precision and it has for its general object to provide a simple and effective device based on a new principle which permits to obtain very high degrees of precision, and which consists of less parts than the devices hitherto used, while its adjustment and its manipulation is of much greater simplicity.

Devices of the type mentioned are, as a rule, constructed as differential devices using a stock of wheels or plates which may be changed. When using such a device in a particular case, the proper wheels or plates have, therefore, to be selected first from a stock of 18 to 24 wheels or plates; in several arrangements of this type a plurality of members has to be changed, and has to be selected as a preliminary step.

The operation of such a differential device with its stock of interchangeable members requires much experience and skill. In fact, rather extensive preliminary calculations have to be performed in each case in order to be able to make the proper selections and to operate the device and, although tables for performing part of said calculations and for listing the changing operations to be performed are used, this type of apparatus requires highly skilled and experienced operators having at least some higher education. Each of the divider wheels, of which a series has to be kept in stock as mentioned, has moreover to be provided with the complete number of series of holes, marks or other adjustment means covering the entire range of possible divisions or adjustments.

Other types of precision devices are optical devices working with a very high precision; but they have to use a very complicated and expensive equipment. In particular, they have to use worm gears of highest precision which are difficult and most expensive to manufacture. Their adjustment and operation also requires highly skilled operators.

The present invention is based on the principle of using a plurality of coupled planetary gears for relating a required small fractional angular movement of a workpiece to the movement of indicating members to be performed along the circumference of a fixed divider or fraction indicating disc, which permits to adjust the exact fraction; this movement on account of the coupled planetary gears can be performed with a very high ratio of translation permitting the highest degree of precision.

If two coupled planetary gear trains are used, three shafts are available whose rotation will be in a fixed relation to each other for every direction of rotation. The work piece to be rotated through a small fraction of the circumference is connected with one of these shafts while the two other shafts are both adjusted, preferably on two series or on two sides of the fixed fraction indicating or divider disc. The concerted adjustment of these two shafts permits to obtain an angular movement or adjustment of the work piece which is inversely proportional to a product of the radii around which the planetary gear revolves and rotates or to a sum of such products and this fact permits to obtain a very high ratio of transmission of movement from the two shafts serving for adjustment to the shaft connected with the work piece and an extraordinary precision of the adjustment.

According to the invention, moreover, the fixed divider or fraction indicating disc has to be provided with two series of holes, marks or other adjustment means, for adjusting the two shafts not connected with the work piece. It is thus seen that a material simplification of the arrangement has taken place, accompanied by a corresponding simplification of the preliminary calculations, and the number of operations to be performed.

The invention will be more fully understood when described in the following detailed specification in which the three basic modifications derived from the use of each of the three available shafts as a work piece carrier is diagrammatically illustrated. It is, however, to be understood that the description of these modifications of an arrangement with two coupled planetary gear trains is of an illustrative character and is not intended to limit the invention to the modifications shown. The diagrams illustrate embodiments of the invention and, on the base of these embodiments, other embodiments will be more or less obvious to experts skilled in this art, which will by no means constitute a departure from the essence or spirit of the invention.

In the accompanying drawings:

Figure 1b is a diagrammatic view of a simplified modification of the modification shown in Figure 1.

Figure 2 is a diagrammatic view of a further modification in which the planetary gears are meshing with central gears having their teeth on their outer periphery, the work piece being connected with the shaft of the larger one of the central wheels.

Figure 2a is a diagram illustrating the pitch circles of the planetary gear train shown in Figure 2.

Figure 3 is a diagram illustrating another modification with coupled planetary gear trains, the planet wheels with internal teeth only arranged at their inner periphery and the work piece being attached to the smaller one of the central wheels.

Figure 3a is a diagram showing the pitch circles of the gear trains shown in Figure 3.

Figure 4 is a diagram of a modification of the invention in which the divider or fraction indivator disc is arranged between the two adjustment means connected with the shafts which serve for adjustment.

Figure 1:
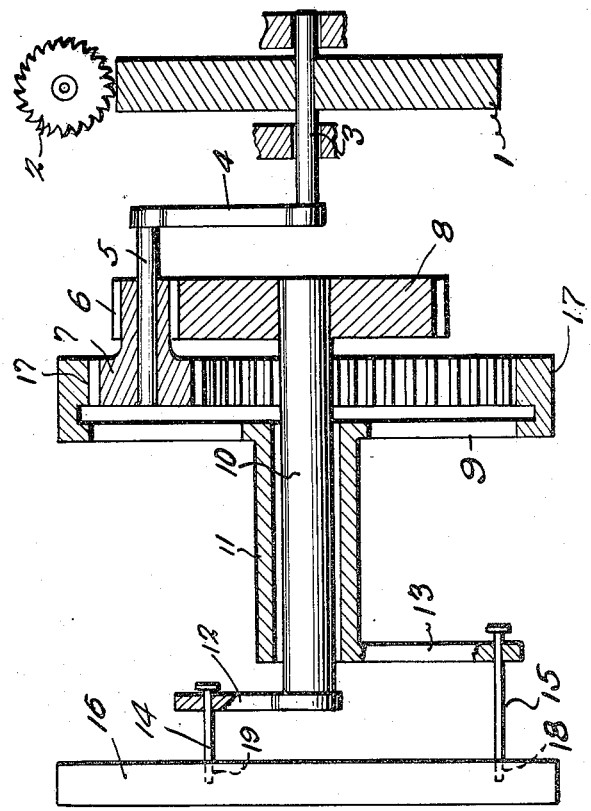
Figure 1 is a diagrammatic view of one modification of the invention in which the planetary gear wheels mesh with one central gear with external teeth and one central gear with internal teeth, and in which the work piece is attached to the shaft around which the pair of planetary wheels is revolving.

The invention will be more readily understood when referring to diagrams which illustrate merely the essential parts of the arrangement without showing the parts, components or members which are unessential to the invention, although they may be necessary mechanically such as journals, bearings, standards, adjustment means for them and the like.

In the diagram it is assumed that the work piece 1 is a toothed wheel or some other piece whose circumference has to be worked by means of a tool such as the miller 2 which has to cut a definite number of teeth or grooves or the like evenly distributed along the circumference so that they are separated by a predetermined angular distance in relation to the circumference. Therefore, it is assumed, the work piece has to be rotated repeatedly for a definite fraction of the circumference.

To be able to adjust the work piece with the requisite precision, it is mounted on the shaft section 3, connected with the carrying arm 4 which carries the shaft section 5, the first named shaft section being that around which the planetary wheels 6 and 7 revolve, while the last named section is that around which they rotate. The angular movement or adjustment of the work piece 1 thus depends clearly on the angular movement of the carrying arm of the planet wheels 6, 7 around the central or sun wheel. The central wheel 8 (with the radius $r_1$) is provided with external teeth. It meshes with the planet wheel 6 (radius $r_2$ at P in Figure 1a) and is carried by the shaft 10. The second central wheel 9 (radius $r_4$) is provided with an inwardly turned rim 17 carrying internal teeth and meshes with the planetary gear wheel 7 (radius $r_3$ at point Q in Figure 1a). The two planetary gear wheels are coupled and are rotating around the same shaft 5 (indicated at M in Figure 1a).

The central toothed wheel 9 rotates on a shaft 11 which is concentric with shaft 10 carrying the second central toothed wheel of the planetary gear. It may be a tubular shaft surrounding the shaft 10.

Each shaft 10 and 11, respectively, carries a radial arm 12, 13, respectively, which is provided with holes. An adjustment or fixation pin 14, 15, respectively, may be inserted into them. Each of these adjustment and fixation pins may be inserted into a series of holes or bores 18, 19, on a fixed divider or fraction adjustment disc 16 which is arranged coaxially with the shafts 10 and 11.

These holes are set in two series around the circumference of a circle drawn around the center of disc 16.

In order to explain the degree of precision which may be obtained by using this arrangement in the way corresponding to this invention, the angular movement or angular velocity around the shaft 3 around which the planet gears are revolving may be designated by Z. This movement, according to Figure 1a, is an angular movement around the point O which is the center of the system. The angular movements of the shaft 10 (radius $r_1$) is designated by X and that of shaft 11 (radius $r_4$) by Y.

The value of Z is then expressed by the following formula, the radii of the gear wheel being those indicated in Figure 1a.

$$Z = \frac{1}{(r_1+r_2)(r_2+r_3)}(r_2 r_4 Y + r_1 r_3 X)$$

By selecting suitable values for the radii and for the number of holes 18, 19 in the disc 16 (usually 100) it is easily possible to make an advance of each pin for one hole 18, 19 of the series correspond to an angular movement of $1/100,000$ of the circumference.

A good example for the number of teeth to be selected is the following:

| | Teeth |
|---|---|
| Central toothed wheel with radius $r_1$ | 91 |
| Central toothed wheel with radius $r_4$ | 111 |
| Planetary toothed wheel with radius $r_2$ | 9 |
| Planetary toothed wheel with radius $r_3$ | 11 |

Or to express it otherwise, the radii of the pitch circles may be the following:

$r_1 = 91$ units
$r_2 = 9$ units
$r_3 = 11$ units
$r_4 = 111$ units

The wheels with this number of teeth or these radii have to fulfill the condition $$r_1 + r_2 = r_4 - r_3$$

as clearly seen from Figure 1a.

To give a practical example, it may be assumed that the circumference of the work piece has to be divided into 197 parts, one part being, therefore, .00507616 of the entire circumference. The ratio above-mentioned for a displacement of each of the arms 12, 13 and pins 14, 15 for one hole and the angular rotation of the work piece corresponds to $1/100,000$; the number of teeth of the toothed wheels is that above stated. It is then necessary to rotate first both arms 14, 15 through 5 complete revolutions (in opposite direction) in order to obtain the first digit of the required displacement. These five complete revolutions produce an angular displacement of the work piece of .005 of a complete revolution. The next two digits are produced by moving the arms in opposite directions for 8 steps or holes, along the circles containing the position adjustment holes this being the closest approximation to or the equivalent of the digits following the .005. As will be seen, the division in such a case (division of the circumference by 197) does not result in a rational number. However, the error is small. It is only .000000384 or less than $1/4,000,000$ of the circumference. It is, therefore, negligible.

Figure 1A:
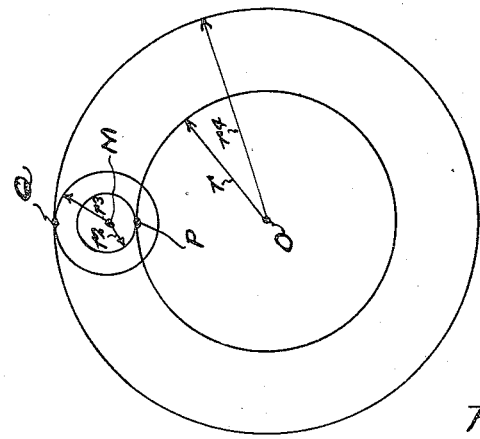
Figure 1a is a diagram showing the pitch circles of the toothed wheels used in these planetary gear trains.

The arrangement shown diagrammatically in Figure 1 may be simplified by using merely one planetary gear wheel 7 which in this case engages both the toothed wheel 17 provided with internal teeth and the toothed center wheel 8 provided with teeth at its outer circumference.

The number of holes 18 and 19 in the adjustment disc 16, however, has to differ in this case. The two series of holes are arranged preferably along circles of different diameter and each series covers a different peripheral angle. If, for instance, the series of 80 holes would cover the full peripheral angle of 360° more than one full turn would have to be performed to cover the holes in the series of 100 holes.

Assuming that the same values which have been taken in the previous example are chosen and that the intended result of obtaining a movement through $1/100,000$ of the circumference of the workpiece carrying disc for an advance of pin 14, 15 for one hole 18, 19 is to be the same, and further assuming that the number of holes 18 is to be 100 while the number of holes 19 is to be 80, it will be clear that for each step (advance for one hole of the series) in the series of holes 18 the rotation X of wheel 8 is $$X = \frac{1}{80}$$

and for each step in the series of holes 19 the rotation Y of wheel 17 is $$Y = \frac{1}{100}$$

The formula for Z (angular movement around center of system) which has been used above, viz.:

$$Z = \frac{1}{(r_1+r_2)(r_2+r_3)}(r_2 r_4 Y + r_1 r_3 X)$$

applies also in this case. The formula is simplified by the fact that in this case $r_2 = r_3$ and therefore reads:

$$Z = \frac{1}{2(r_1+r_2)}(r_4 Y + r_1 X)$$

As an example the following values for the radii of the toothed wheels are given:

$r_1 = 111$ units
$r_2 = r_3 = 14$ units
$r_4 = -139$ units

Z then may be calculated to $$Z = \frac{1}{2.125} + \frac{-139}{100} + \frac{111}{80}$$

$$Z = \frac{1}{100,000}$$

Considering now the modification shown in Figure 2, it is seen that the work piece 1 in this case is connected with the shaft 31 of the larger central toothed wheel 29 (radius $r_4$) which meshes with the planetary wheel 27 (radius $r_2$ at Q in Figure 2a), while the smaller one 28 of the central wheels (radius $r_1$) meshes with the second planetary wheel 26 (radius $r_3$). The shaft 25 around which the planetary wheels rotate is attached by means of a carrying arm 24 to the shaft 23 and this shaft is co-axial with shafts 30 and 31 of the two central wheels. Shaft 23 is a tubular shaft surrounding shaft 30 and it carries the fixation arm 33 the position of which is adjusted on the divider or fraction adjustment disc 16 by means of pins 34.

A second fixation arm 32 is attached to shaft 30 of central wheel 29 and is adjusted on disk 16 by means of pin 35.

Again, as in the previous case, the fixed divider disc is provided with two series of holes 18, 19 for the adjustment of the two arms 32 and 34 by means of pins 34, 35.

With this modification, the angular movement of the work piece is derived from the shaft of the larger wheel with the radius $r_4$ meshing (at Q) with the planetary wheel $r_2$, while the second planetary wheel $r_3$ meshes (at P) with the smaller central wheel with the radius $r_1$. When the angular velocity or the angular movement around point O of wheel $r_1$ is again designated by X, that of wheel $r_4$ by Y and that of the aggregate wheels $r_2$, $r_3$ by Z, as in the case of the modification shown in Figure 1, the angular velocity or the angular movement of the work piece (now identical with that of wheel $r_4$) is $$Y = Z \frac{(r_1+r_3)(r_3-r_2)}{r_4 r_3} + X \frac{r_1 r_2}{r_4 r_3}$$

With a suitable selection of the number of holes 18, 19 in the divider disc 16 (usually 100 as before) and of the relation of the radii or number of teeth, the same ratio of the transmission of the movement as before ($1/100,000$ of the circumference of the work piece for the advance through one hole on the divider disc) may be obtained.

An example of the proportion in which the radii of the pitch circles or the number of teeth may be chosen is:

$r_4 = 125$ units   $r_1 = 111$ units
$r_2 = 18$ units    $r_3 = 32$ units

Using the above given formula it will be seen that the value of $$Y = \frac{1}{100,000}$$

is obtained therewith.

A third type of coupled planetary gear trains is shown in Figure 3. It uses central wheels with internal teeth only and the work piece 1 is coupled with shaft 40 of wheel 38 (radius $r_1$) which meshes with planetary wheel 37 (radius $r_2$) at Q (Figure 3a). Planetary wheel 36 (radius $r_3$) coupled therewith meshes with wheel 39 (at P Figure 3a). The planetary couple revolves by means of carrying arm 54 around shaft 53 carrying a fixation and position adjustment arm 43 provided with a hole through which fixation and adjustment pin 46 passes. Shaft 41 of wheel 39 is co-axial with 53 and carries fixation and adjustment arm 42 provided with a hole through which fixation and adjustment pin 45 passes. The two pins 45, 46 are adjusted in the holes of the divider disc.

If X, Y, Z again designate rotation around O of $r_1$, $r_4$ and the center M of the planetary wheels, respectively $$X = \frac{Y r_4 r_2 + Z(r_4-r_3)(r_2-r_3)}{r_3 r_1}$$

Values for the radii or number of teeth are for example:

$r_1 = 125$   $r_4 = 143$
$r_2 = 14$    $r_3 = 32$

With the circumference of the divider disc divided into 100 parts (marked by holes in two series) X is again $1/100,000$.

In Figure 4 it is shown how only one series of holes in the divider disc may be used for the adjustment of both fixation arms and serve for the adjustment of the pins independently of each other. This modification may, of course, be used in connection with every type of divider above described. As shown in Figure 4, the fixed divider disc in this case is carried by a sleeve 50 through which one of the shafts, for instance, 53 passes. The two fixation arms 42, 43 may, therefore, be arranged on the two sides of the fixed divider disc and the adjustment pins 45, 46 may be inserted into the series of holes 18, 19 from opposite sides, the holes in this case, of course, passing right through the fixed disc.

It is to be understood that the foregoing description and illustration has a diagrammatic character and that it explains this invention in terms enabling the expert to construct devices of the character described. The conventional or customary parts, components and members and variations and changes of a non-essential character have, therefore, not been explained in detail as these changes will be obvious to the expert skilled in this art; they do not constitute an addition to or a departure from the invention.

What I claim is:

1. In a device of the character described an indexing device for producing angular movements of a work piece being a fraction of the circumference of a full circle, comprising interlinked planetary gear trains forming a compound epicyclic gear train, said gear trains including coaxial shafts, gears on two of said shafts, at least one train arm on another of said shafts, rotatable around the common axis of the coaxial shafts, a planetary shaft carried by the said train arm, a planetary gear on said planetary shaft in mesh with said first mentioned gear, one of said shafts being connected with a work piece, each of the other shafts being provided with fixation means, a fixed divider disk facing said other of said coaxial shafts and arranged so as to intersect the axis of said coaxial shafts at right angles, the disk being provided with a plurality of means selectively cooperating with and fixing the position of said fixation means, said means being arranged in a circle around the axis of said disk and said axis of the coaxial shafts, the rotation of one of the shafts facing the divider disk, while the other shaft is held by said fixation means, determining the extent of the angular movement of the work piece.

2. A device for producing small angular movements of a work piece with great precision, comprising interlinked gear trains forming a compound epicyclic gear train, said gear train including three coaxially arranged shafts, two of them aligned longitudinally and one of them being tubular and arranged concentrically with one of the said aligned shafts, a train arm on said tubular shaft, a planetary shaft carried by said train arm, a pair of gear wheels on the two aligned shafts, a pair of planetary wheels connected with each other for rotation in common, carried by and mounted on said planetary shaft, said two gear wheels operatively engaging the said planetary wheels respectively, a divider disk facing the two concentrically arranged shafts, arranged at right angle to the common axis of said shaft, a driving and fixation arm carried by each of said concentric shafts, a fixation pin on each arm, means on said divider disk for fixing said pins in a plurality of angular positions, said arms being moved through the required angle for advancing the work piece and being then fixed by means of said pins on said fixed divider disk.

PABLO LETELIER.

REFERENCES CITED

The following references are of record in the file of this patent:

UNITED STATES PATENTS

| Number | Name | Date |
|---|---|---|
| 2,357,329 | Hansen | Sept. 5, 1944 |
| 2,367,952 | Lichtwitz | Jan. 23, 1945 |

FOREIGN PATENTS

| Number | Country | Date |
|---|---|---|
| 412,482 | Great Britain | June 28, 1934 |